(12) United States Patent
Lim et al.

(10) Patent No.: US 11,291,280 B2
(45) Date of Patent: Apr. 5, 2022

(54) TRANSPORTATION

(71) Applicant: DLIP Limited, Hamilton (NZ)

(72) Inventors: David Tien Ang Lim, Hamilton (NZ);
Jason Paul Rogers, Hamilton (NZ);
Graham Brewster, Hamilton (NZ)

(73) Assignee: DLIP Limited, Palmerston North (NZ)

( * ) Notice: Subject to any disclaimer, the term of this patent is extended or adjusted under 35 U.S.C. 154(b) by 211 days.

(21) Appl. No.: 16/648,167

(22) PCT Filed: Sep. 18, 2018

(86) PCT No.: PCT/NZ2018/050124
§ 371 (c)(1),
(2) Date: Mar. 17, 2020

(87) PCT Pub. No.: WO2019/059781
PCT Pub. Date: Mar. 28, 2019

(65) Prior Publication Data
US 2020/0260827 A1 Aug. 20, 2020

(30) Foreign Application Priority Data
Sep. 19, 2017 (NZ) ........................ 735635

(51) Int. Cl.
*B65D 85/68* (2006.01)
*A45C 5/14* (2006.01)
(Continued)

(52) U.S. Cl.
CPC ............ *A45C 5/14* (2013.01); *B25H 1/0014* (2013.01); *B25H 3/02* (2013.01); *B62H 3/02* (2013.01);
(Continued)

(58) Field of Classification Search
CPC .......... A45C 5/14; B25H 1/0014; B25H 3/02; B62H 3/02; B65D 85/68; B65D 2585/6862
(Continued)

(56) References Cited

U.S. PATENT DOCUMENTS 3,734,272 A * 5/1973 Galen .................... B65D 85/68
206/335
4,792,039 A * 12/1988 Dayton .................... A45C 5/14
206/304
(Continued)

FOREIGN PATENT DOCUMENTS

DE 10019542 A1 11/2000
DE 102011121417 A1 6/2013
(Continued)

OTHER PUBLICATIONS

Bike Transport Cases—Thule RoundTrip Transition, Published on Jun. 24, 2015 [online], [viewed from internet on Jan. 10, 2019] <url: https://www.youtube.com/watch?v=zk-NIBjSyWM>.
(Continued)

*Primary Examiner* — Jacob K Ackun
(74) *Attorney, Agent, or Firm* — Knobbe, Martens, Olson & Bear, LLP

(57) ABSTRACT

A protective case for a bicycle which is an enclosed hollow rectangular cuboid including a top half; a lower half; wherein said top and lower halves releasably connect together to form the enclosed cuboid; and wherein each of said halves has: rigid outer wall sections for each surface of the cuboid so that the cuboid is fully enclosed; wherein at least the lower half has a stand attached thereto and said stand being adapted to connect to a bicycle frame of the
(Continued)

bicycle and said case being adapted to support said bicycle when the stand is in, either: a non-extended position; and an extended position.

8 Claims, 11 Drawing Sheets

(51) Int. Cl.
    *B25H 1/00*     (2006.01)
    *B25H 3/02*     (2006.01)
    *B62H 3/02*     (2006.01)

(52) U.S. Cl.
    CPC ...... *B65D 85/68* (2013.01); *B65D 2585/6862* (2013.01)

(58) Field of Classification Search
    USPC .......................................................... 206/335
    See application file for complete search history.

(56) References Cited

U.S. PATENT DOCUMENTS

| | | | |
|---|---|---|---|
| 4,892,190 A * | 1/1990 | Delgado | ................ B65D 85/68 |
| | | | 206/335 |
| 4,991,715 A | 2/1991 | Williams | |
| 5,320,227 A | 6/1994 | Minoura | |
| 2012/0305425 A1 | 12/2012 | Waters | |
| 2014/0265196 A1 | 9/2014 | Pelegrin | |
| 2020/0189684 A1* | 6/2020 | Engel | ................... B62K 27/003 |
| 2021/0000234 A1* | 1/2021 | Kax | ....................... A45C 11/00 |

FOREIGN PATENT DOCUMENTS

| | | |
|---|---|---|
| DE | 102013013901 A1 | 12/2014 |
| EP | 0 597 150 A1 | 5/1994 |
| FR | 2535291 A1 | 5/1984 |
| WO | 2014/086907 A1 | 6/2014 |
| WO | 2017/124076 | 7/2017 |

OTHER PUBLICATIONS

International Preliminary Report on Patentability, PCT/NZ2018/050124, dated Jul. 1, 2019.

International Search Report in International Application No. PCT/NZ2018/050124, dated Jan. 16, 2019.

* cited by examiner

TRANSPORTATION

TECHNICAL FIELD

The present invention relates to improvements in and relating to transportation. In particular, the transportation of bicycles.

BACKGROUND ART

The transportation of bicycles—which can be very expensive when one looks at high end road bikes and mountain bikes—often requires a transportation and storage solution which protects the bike whilst in transit.

Protective cases for bicycles—typically known as bicycle carry boxes—are useful for cyclists who wish to transport their bike long distances—via carriers, airlines or their own car—and want their bike to be encapsulated and fully protected during the journey.

It would be useful if a bicycle carry box could provide additional functions over and above their ability to transport and protect a bike whilst at the same time not compromising this function.

It is an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Throughout this specification, the word "comprise", or variations thereof such as "comprises" or "comprising", will be understood to imply the inclusion of a stated element, integer or step, or group of elements, integers or steps, but not the exclusion of any other element, integer or step, or group of elements, integers or steps.

Further aspects and advantages of the present invention will become apparent from the ensuing description which is given by way of example only.

DEFINITIONS

The term 'wall' as used herein refers to a surface which surrounds or separates an area and can protect the area surrounded from outside intrusion.

DISCLOSURE OF THE INVENTION

According to one aspect of the present invention there is provided a protective case for a bicycle which is an enclosed hollow rectangular cuboid including:
   a top half;
   a lower half;
wherein said top and lower halves releasably connect together to form the enclosed cuboid; and
wherein each of said halves has:
   rigid outer wall sections for each surface of the cuboid so that the cuboid is fully enclosed;
wherein at least the lower half has a stand attached thereto and said stand being adapted to connect to a bicycle frame of the bicycle and said case being adapted to support said bicycle when the stand is in, either:
   a non-extended position; and
   an extended position.

According to a second aspect of the present invention there is provided a protective case for a bicycle which has a top half and a lower half each half having one or more wall sections substantially defining an interior area on the inner surface of said wall(s); wherein said top and lower halves are releasably connected to one another they form an at least substantially enclosed space; and wherein the lower half of the protective case includes a stand attached thereto said stand adapted to connect to a bicycle frame of the bicycle and said case being adapted to support said bicycle when the stand is in, either:
   a non-extended position; and
   an extended position.

According to a third aspect of the present invention there is provided a protective case for a bicycle which has a top half and a lower half substantially as described above wherein at least one outer side wall on the top half of the protective case when connected side by side to the lower half of the protective case is capable of folding down to a substantially planar horizontal position which can then act as a working floor and/or a further stabiliser.

Preferably, the case is adapted to support the bicycle when the stand is in the non-extended and extended positions via the top and lower halves of the protective case connecting together, either:
   on top of one another to form a substantially enclosed hollow rectangular cuboid, when the stand is in a non-extended position; and
   side by side to form a base of greater lateral dimensions than the enclosed hollow rectangular cuboid, to provide additional stability when the stand is in an extended position particularly when holding the fully assembled bicycle.

According to a further aspect of the present invention there is provided a protective case for a bicycle substantially as described above wherein the stand for supporting the bike is telescopic.

According to a further aspect of the present invention there is provided a method of converting a protective case for a bicycle between a transport configuration and a work configuration, comprising the steps of:
   a) connecting a top half and a lower half of a protective case on top of one another and ensuring a telescopic stand holding said bicycle is in a retracted state: to effect a transport configuration;
   b) disconnecting, the top half and lower half of the protective case;
   c) connecting the top half and lower half of the protective case to one another to be side by side and extending the telescopic stand to its fully extended state: to effect a work configuration.

BRIEF DESCRIPTION OF THE DRAWINGS

Further aspects of the present invention will become apparent from the ensuing description which is given by way of example only and with reference to the accompanying drawings in which.

BEST MODES FOR CARRYING OUT THE INVENTION

Figure 1:
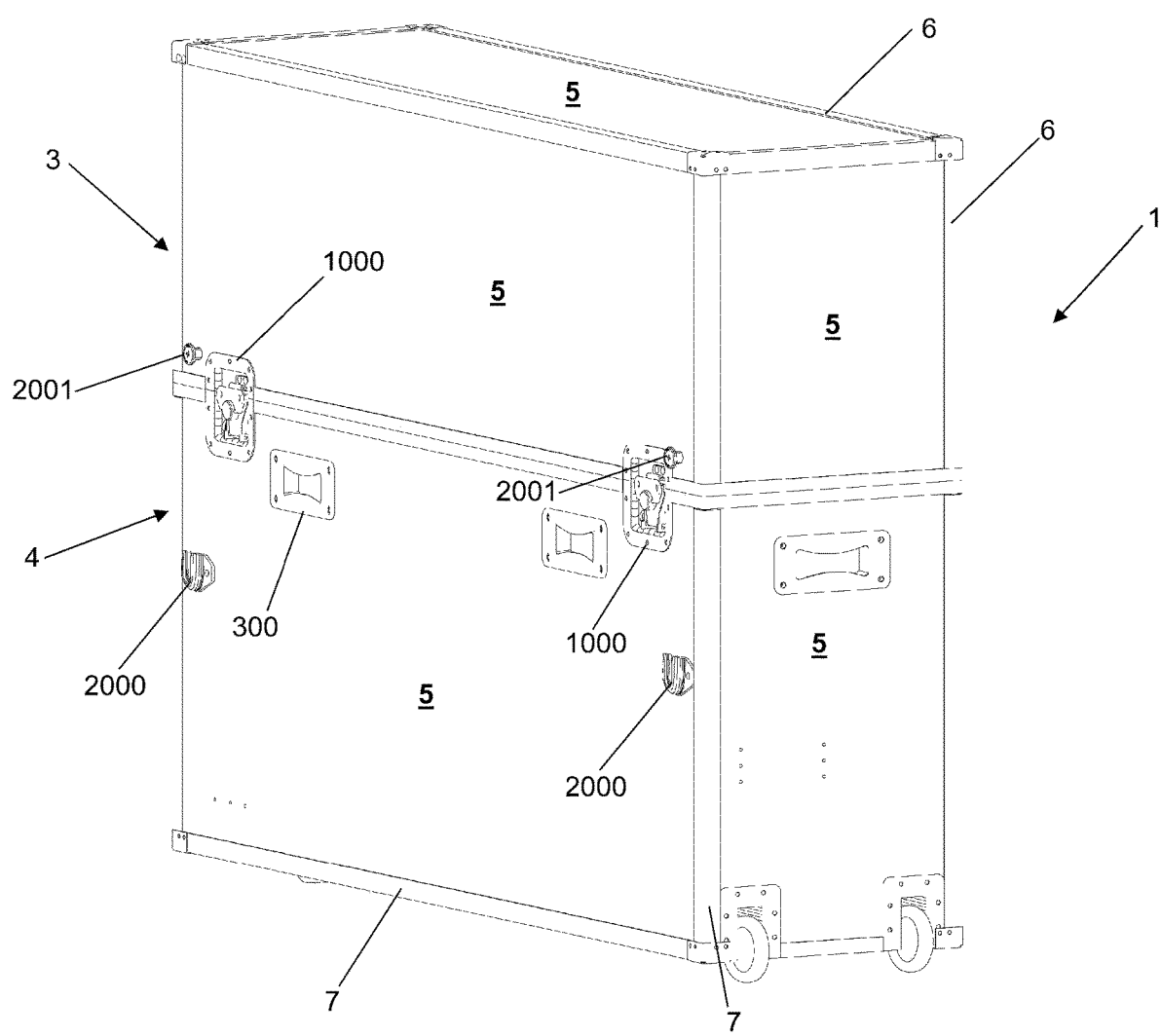
FIG. 1 shows a perspective view of a protective case, in a closed 'transport' configuration, in accordance with one preferred embodiment of the present invention.

With respect to FIGS. 1-3 and FIGS. 8 and 9 there is provided a protective case 1 for a bicycle 2. The protective case has a top half 3 and a lower half 4 which are connected on top of one another by a plurality of hold down latches 1000.

The top and lower halves 3,4 have rigid outer walls 5 made from composite sheets formed from a honey comb aluminium core sandwiched between two sheets of aluminium. The composite sheets are riveted to a frame having frame members 6 on the top half and a frame having frame members 7 on the lower half. The frame members 6,7 being in the form of aluminium extrusions. The lower half 4 has handles 300 thereon to assist with lifting and holding the protective case 1.

The lower half 4 has a telescopic stand 8 attached to:
the base of the lower half 4 via a flanged socket 20; and
the upper portion of the inside of said rigid walls 5 via a flanged u-shape brace 21.

The lower half 4 also has wheel clamps 3000, 3001 for holding the front and rear wheels of a bicycle 2 once they have been removed for transportation of the bike within the protective case 1.

When the top and lower halves 3,4 are connected together on top of one another the handles of the bicycle are removed for storage therein and transportation. The wheels of the bicycle are also removed for storage and transportation.

The telescopic stand 8 has a v-shaped channel 9 that is inwardly cantilevered from the top thereof into which the frame 10 of a bicycle 2 can be placed. The v-shaped channel also has a Velcro strap 11 which goes over the frame 10 of the bicycle 2 to hold the frame 10 in the channel 9.

Figure 2:
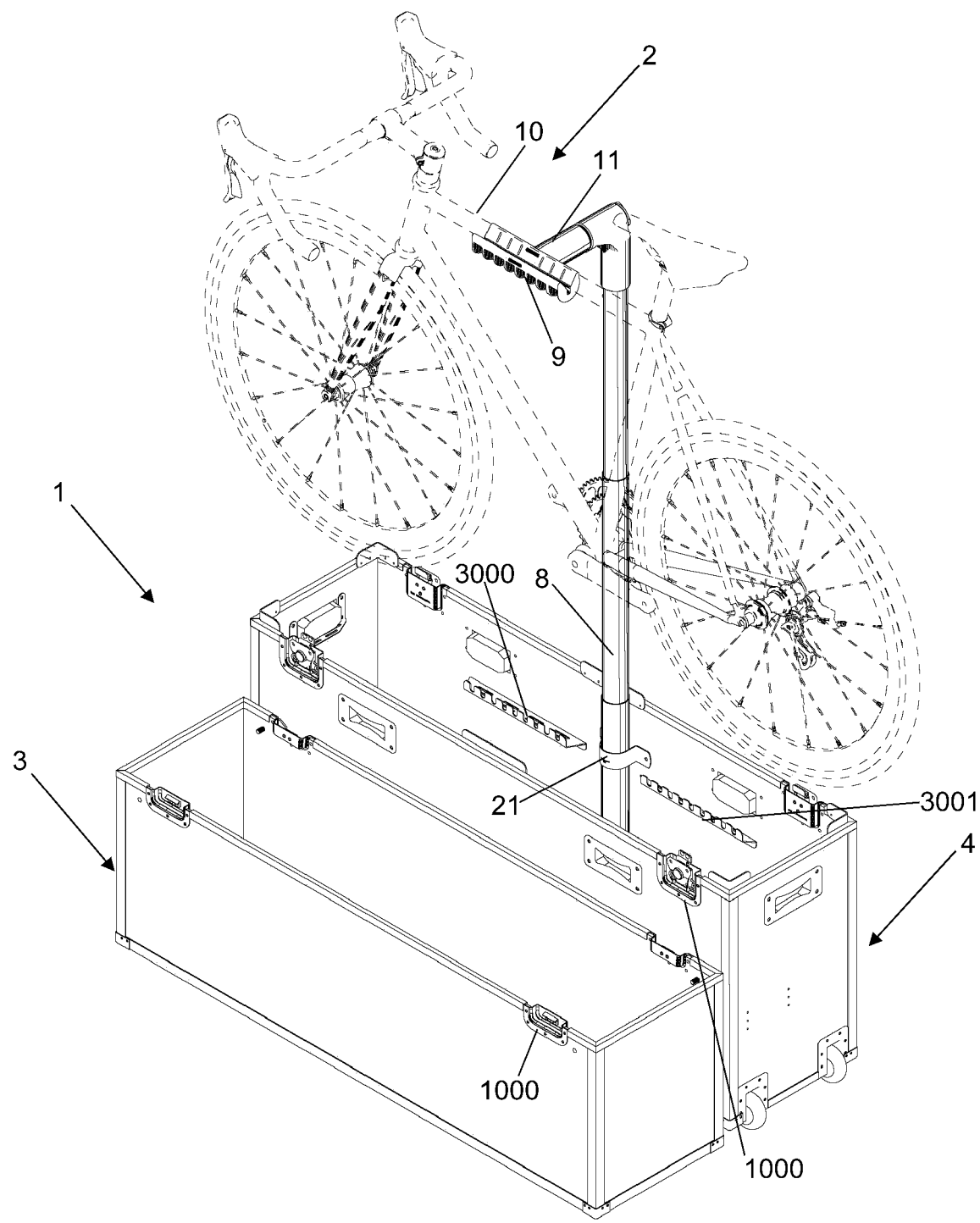
FIG. 2 shows a perspective view of the protective case in FIG. 1 in an open 'workshop mode' configuration.
Figure 3:
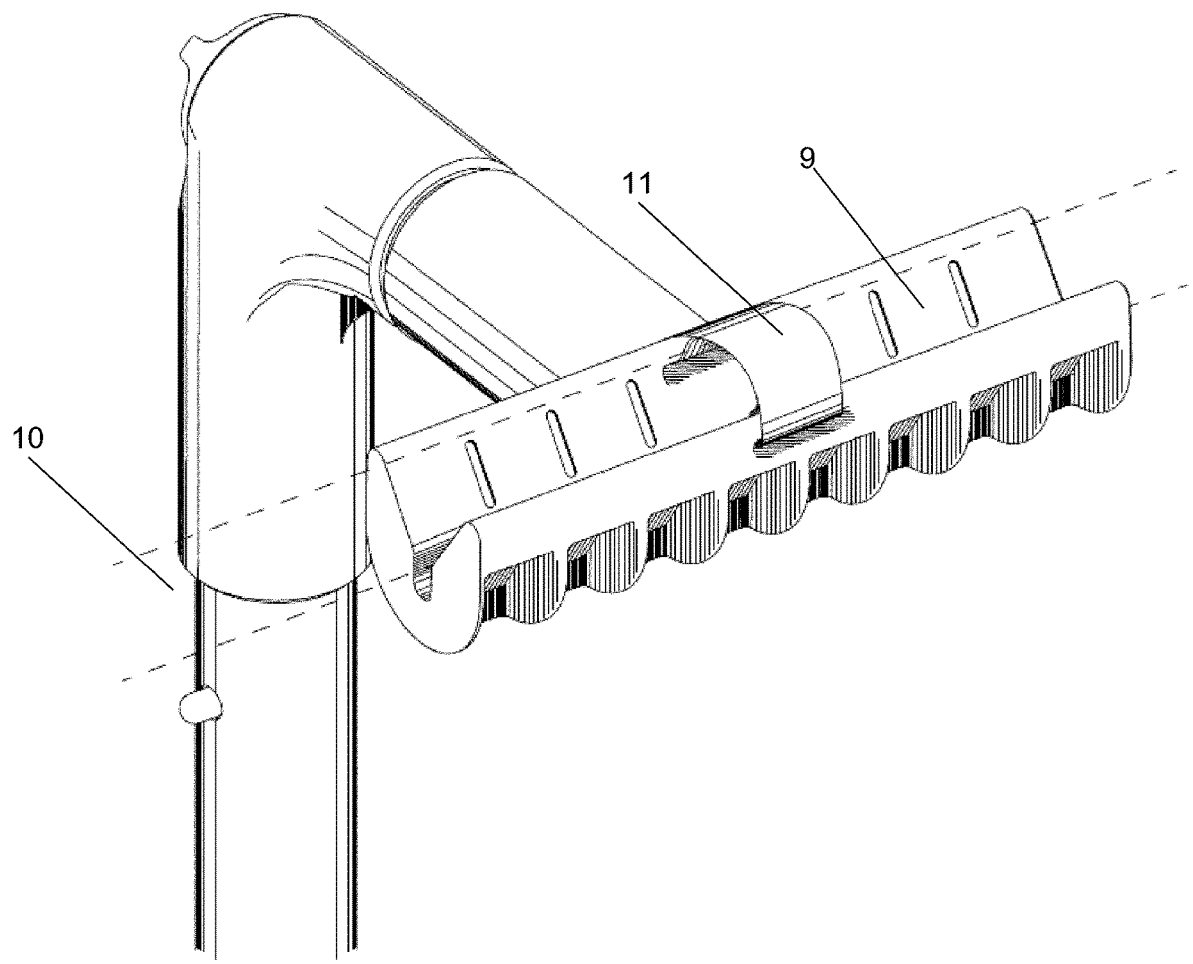
FIG. 3 shows a close-up view of the v-channel and strap shown in FIG. 2.
Figure 4:
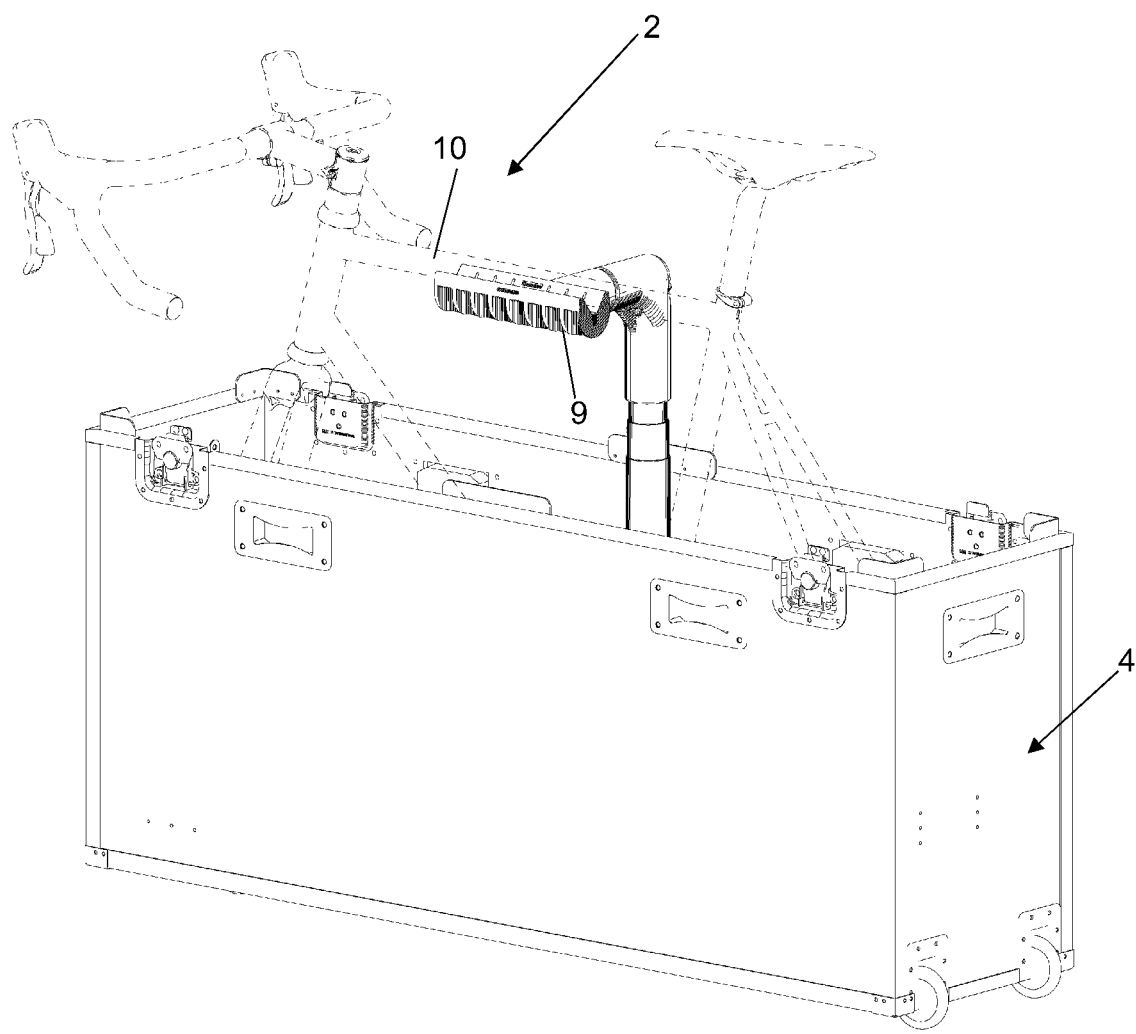
FIG. 4 shows a perspective view of the protective case in FIGS. 1 and 2 in an open 'pre-transport' configuration.

When the telescopic stand is in an extended position—see FIG. 2 and the top half 3 connected side by side to the lower half 4—this transforms the protective case 1 into a free standing mobile work shop for working on the bike 2. Conversely, when the telescopic stand is in a retracted position see FIG. 4 the stand becomes a stay for holding the bike 2 securely in place within the protective case 1 whilst the bike is in transit.

The top half 3 and lower half 4 connect to one another so as to be side by side via open ended channels 2000 which are located on the lower half and into which a pair bulbous protrusions 2001 on the top half are placed so as to sliding engage with one another to effect a connection.

Figure 5:
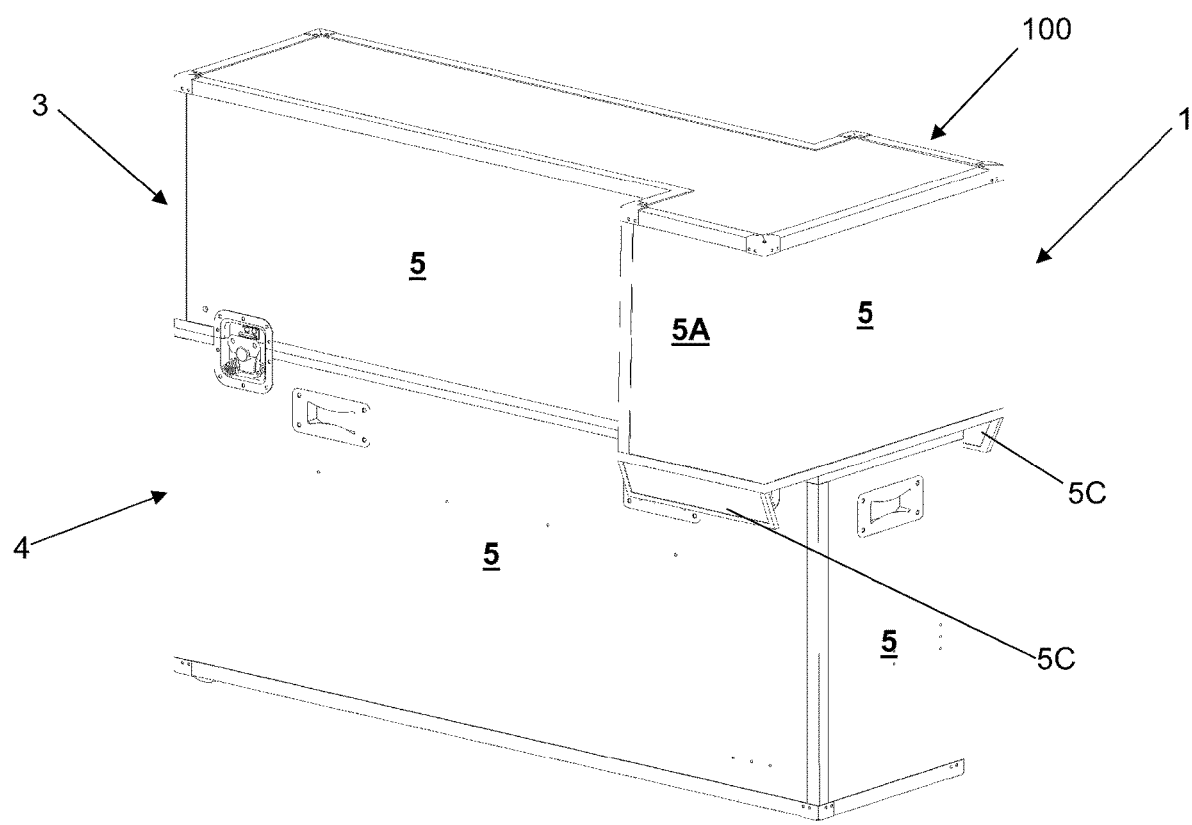
FIG. 5 shows a perspective view of an alternate embodiment of protective case wherein the case has a top half adapted to receive the handle bars of a bike.
Figure 6:
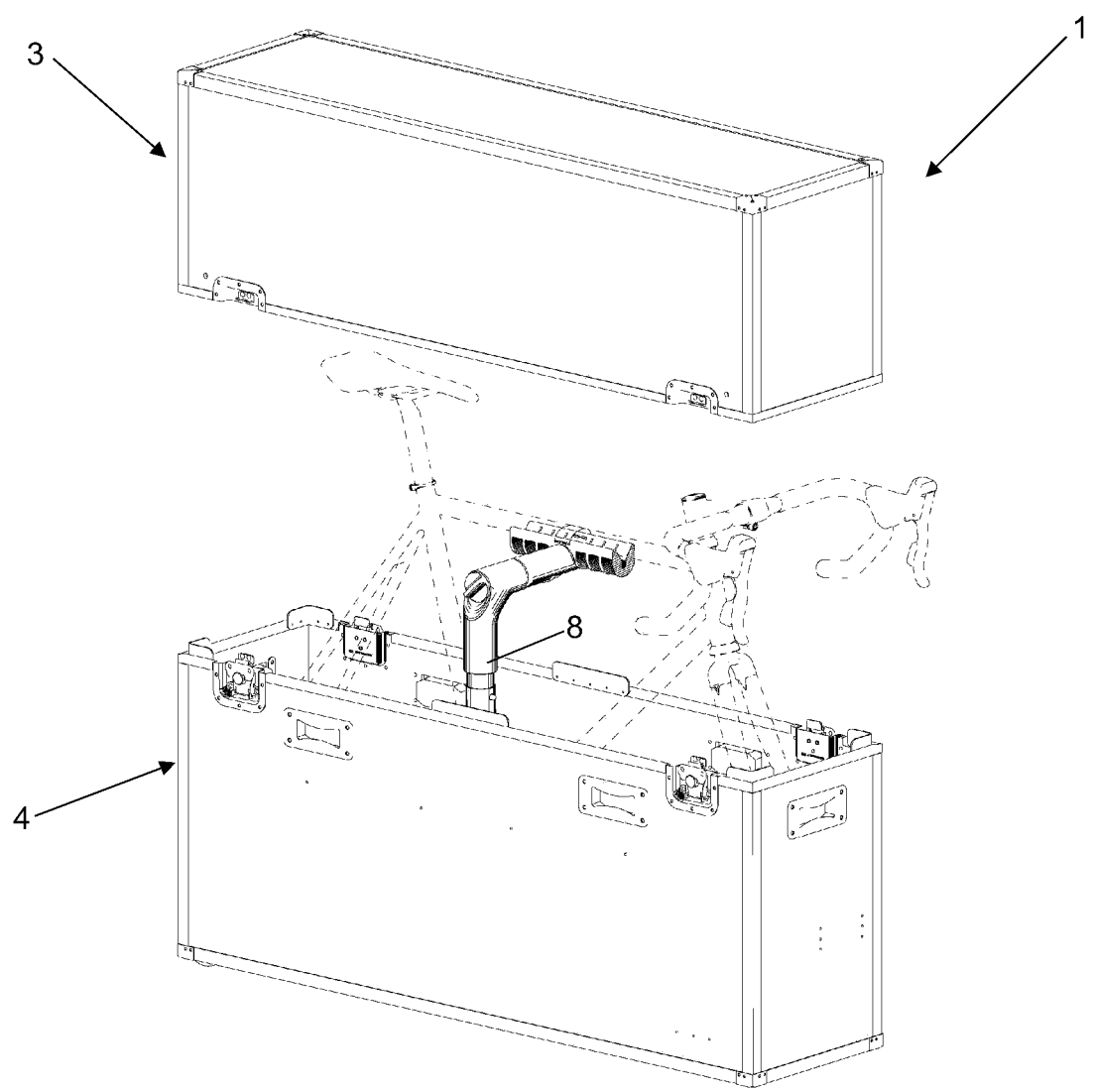
FIG. 6 shows a perspective view of the protective case in FIGS. 1-4 prior to being placed onto the lower half of the protective case the stand is in a non-extended transport configuration.
Figure 7:
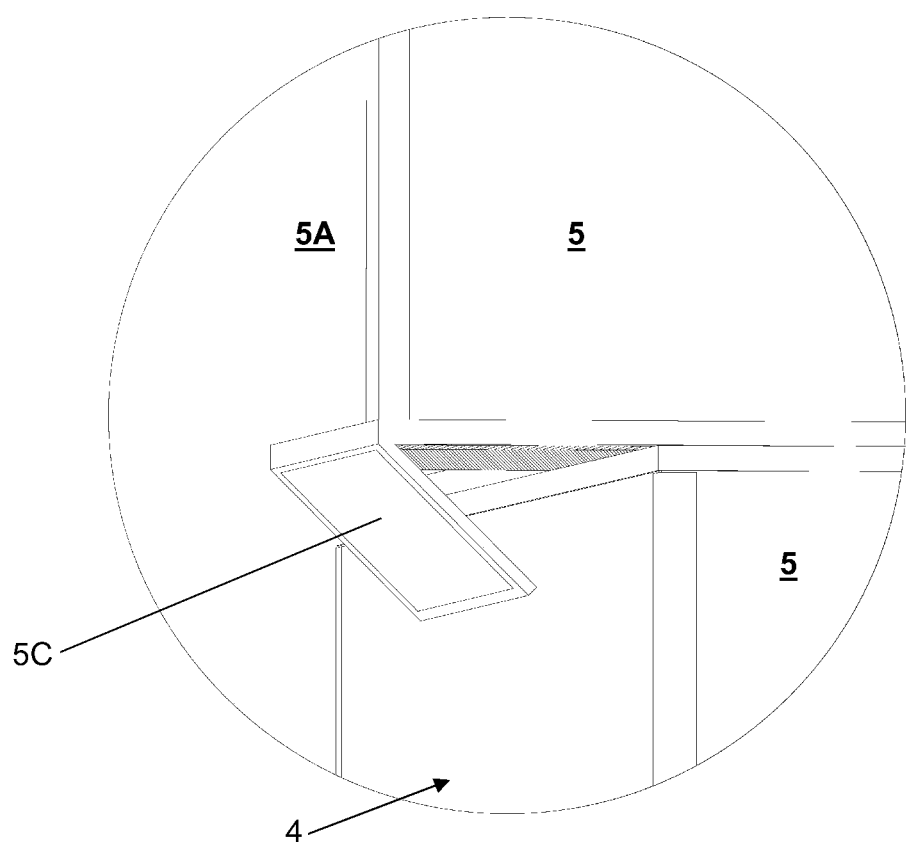
FIG. 7 shows a close-up view of the top half of the protective case and how it is adapted to close around the handle bars once the top half is placed onto the lower half of the protective case.
Figure 8:
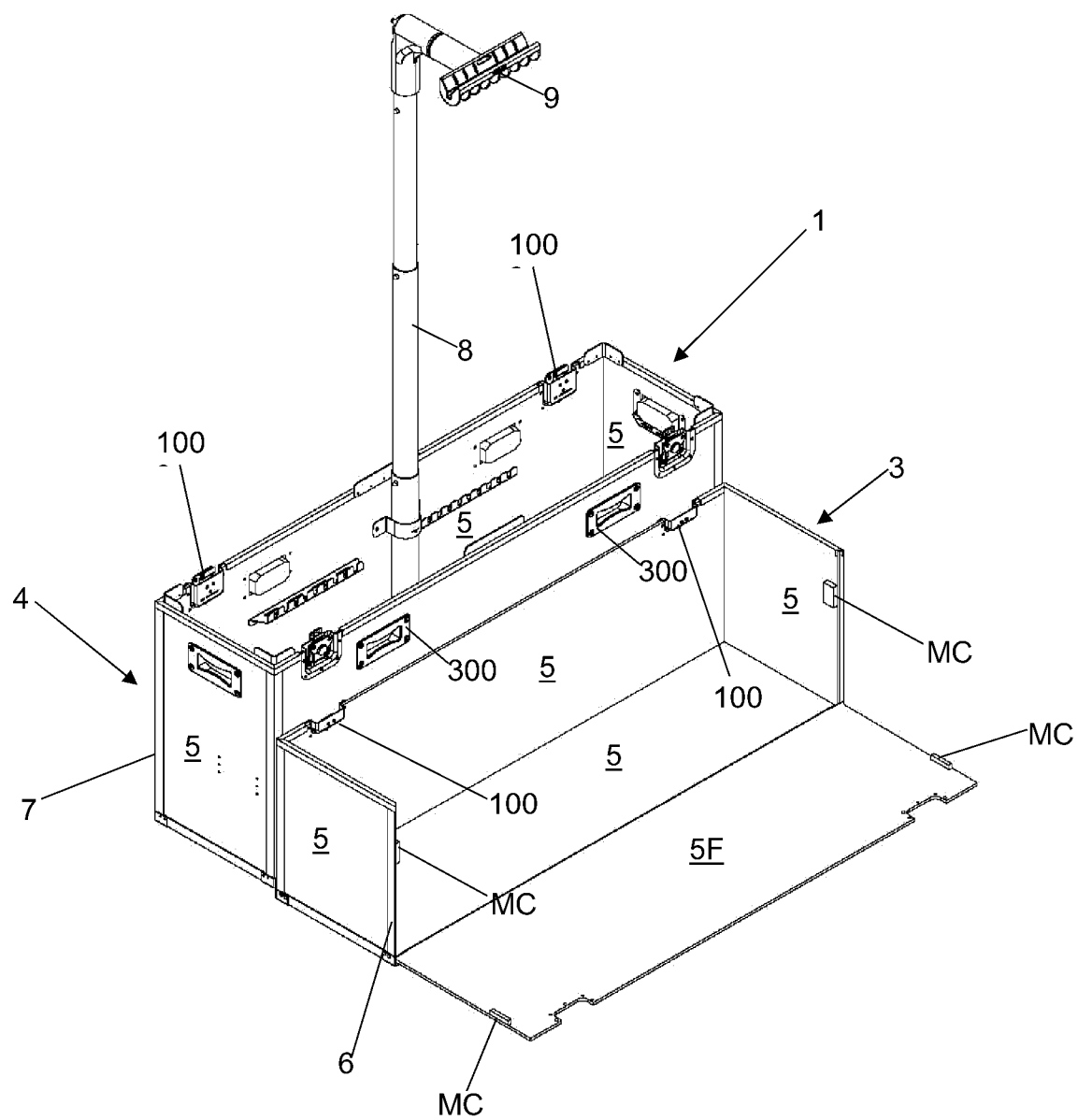
FIG. 8 shows another perspective view of the protective case shown in FIGS. 1-3.

In FIGS. 5 and 7 there is shown an embodiment where the top half 3 has an additional wing portion 100 at the front end 101 thereof which enables the handle bars to remain in place and not be removed for storage and transportation. The wing portion 100 has additional walls 5A shown and 5B (not shown) as well as hinged wall flaps 5C.

Figure 9:
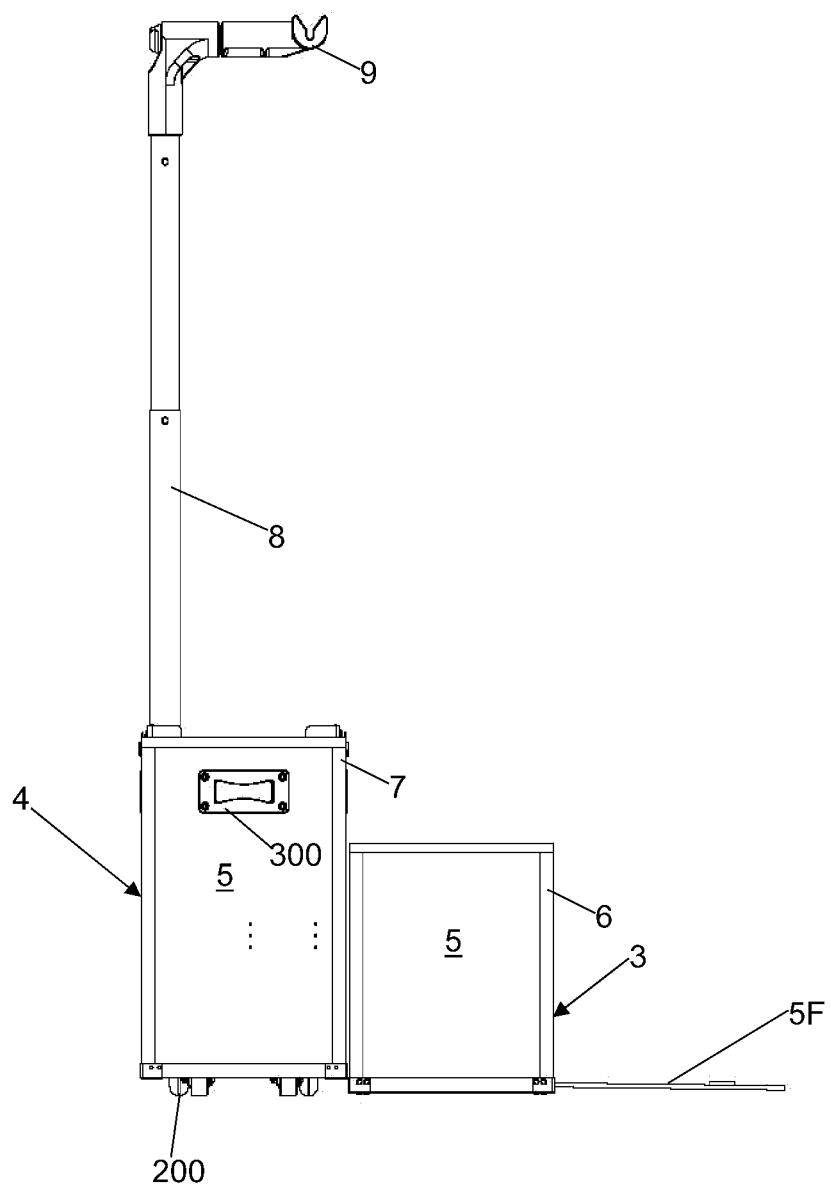
FIG. 9 shows a side view of FIG. 8.

FIG. 9 shows that when the top and lower halves 3,4 are connected side by side to create a wider base of the case to help support the bike when the telescopic stand 8 is in an extended 'work' position. It can be seen that the top half 3 is offset with respect to the lower half 4 to rest on the ground and present a brake to wheels 200 on the lower half 4.

Figure 10:
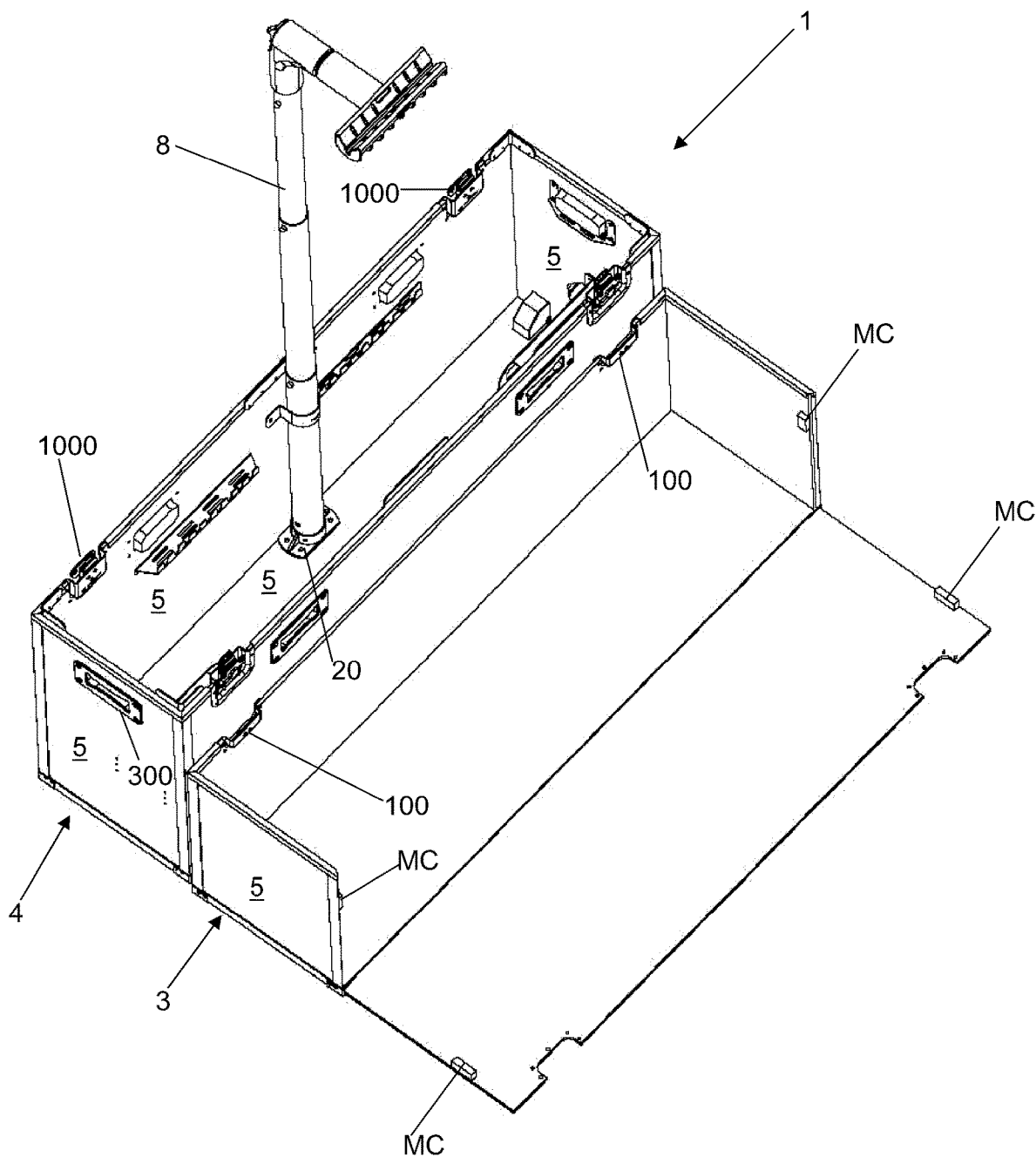
FIG. 10 shows an alternate embodiment of the case shown in FIGS. 8 and 9.

FIG. 10 shows the protective case 1 in its free standing mobile work shop mode with the:
telescopic stand 8 extended; and
the top half 3 and lower half 4 connected side by side.

The top half 3 has magnetic connectors (MC) on the front frame members 6M and on the edge of front wall 5F. The magnetic connectors enable the front wall 5F of the top half to fold forward to create a work floor WF.

Figure 11:
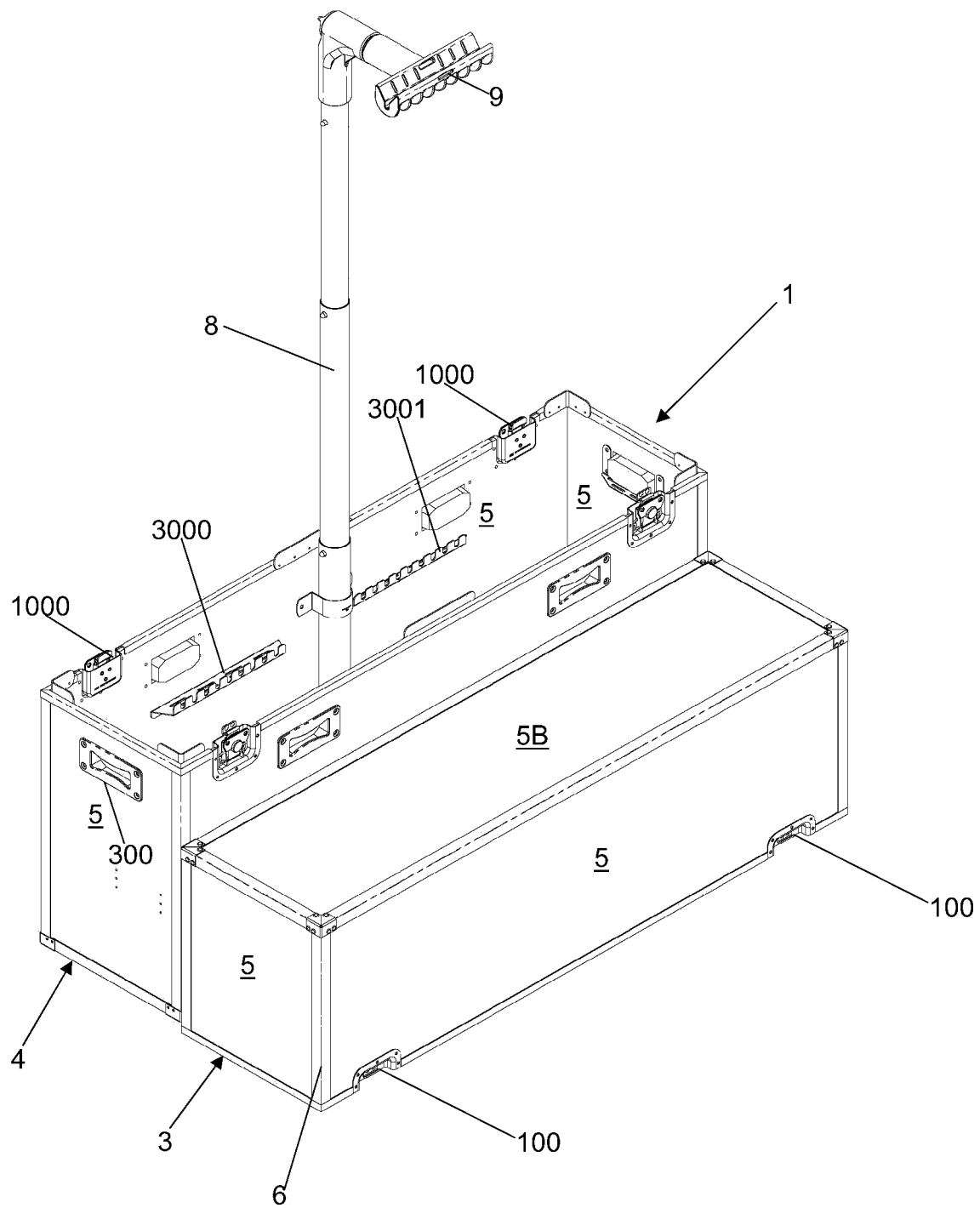
FIG. 11 shows another alternate embodiment of the case shown in FIGS. 8 and 10.

FIG. 11 shows an embodiment where the top half of the case is connected side by side to the lower half of the case to create a bench 5B.

ALTERNATE WAYS TO IMPLEMENT THE PRESENT INVENTION

The stand may come in a variety of different forms without departing from the scope of the present invention.

In one preferred embodiment the stand may be telescopic.

In some embodiments the stand may have one or more tubes which are adapted to
connect to one another to extend the stand; or
disconnect from one another to return the stand to a non-extended position.

The walls of the top and lower halves of the protective case may be made from a number of different materials and methods without departing from the scope of the present invention.

In preferred embodiments the rigid outer walls may be made from aluminium plastic or composite sheets.

In some preferred embodiments the sheets may be attached to a frame.

In some embodiments the frame members on one side of the top and bottom halves may be magnetic and capable of being used to connect the two halves in a side by side configuration.

In other embodiments the rigid outer walls may be made from hardboard or customboard sheets.

In some further preferred embodiments the walls for each half may be formed from a mould.

In some such embodiments the lower half may be formed to have at least one socket on an internal side of one longitudinal side wall. The socket, in use, receiving the base of a stand.

In some other such embodiments the top and lower half may have one or more at least partially curved walls.

It is envisaged that the top half and lower half of the protective case may be made from different materials or constructions such that the top half is more light weight than the lower half. By this means the lower half can act as a stable base when the telescopic stand is in an extended position. In addition, this enables a lower center of gravity to be maintained when the protective case has a hinged top half connecting to the lower half.

In some embodiments the lower half may have retractable legs to provide stability.

In some embodiments the lower half may also have recessed wheels and/or one or more handles. The wheels and/or handles helping to assist with transportation of the case: to or from a vehicle, or whilst in transit in airport terminals prior to checking luggage or after collecting luggage.

In some embodiments the lower half may be made from more dense materials than the top half or may have additional materials, or weights, added thereto, to provide a stable base when the telescopic support stand is in its extended position supporting a bike to be worked on.

Preferably, the frame of the protective case may be made from light weight elongate frame members, such as, but not limited to:
- aluminium extrusions;
- plastic extrusions;
- carbon fibre rectangular or circular tubes.

In some embodiments the protective case of the present invention may include one or more of the following features:
- a mount for affixing to a vehicle;
- an indicator and tail light system for vehicles when the protective case is mounted to a tow bar or tow hitch;
- LED lights (or other low energy high output lights) around and/or proximate the top rim of the lower half of the protective case to illuminate the stand when working in low light environments;
- internal supports for holding gear bags.

The two halves of the protective case may releasably connect together on top of one another in a number of ways without departing from the scope of the present invention.

In one preferred embodiment the two halves of the protective case may use a plurality of toggle latches to connect together.

In another preferred embodiment the two halves of the protective case may use a plurality of quick release push clips. The quick release push clips may in some embodiments have male and female halves.

In one embodiment two halves may connect to one another using quick release buckles integrally formed into the top and bottom halves.

In some embodiments the two halves of the protective case may use rotating latches on one half of the case which have slots therein which locate on bosses located on the other half of the case.

The stand may be adapted to connect to a bicycle frame in a variety of ways.

In one preferred embodiment the stand may include a channel into which the frame can be placed.

The shape of the channel may vary.

In one embodiment the shape of the channel may be substantially v-shaped.

In another embodiment the shape of the channel may be substantially u-shaped.

In still other embodiments the shape of the channel may be semi-circular in shape.

The channel may also include a clamp or other mechanism to retain the frame in the channel.

In another embodiment the stand may include at least two support arms onto which the bicycle frame can be placed. The arms having a bungy cord arrangement for holding the frame onto the arms.

There are a number of ways the case may be adapted to connect together side by side to form a base of greater lateral dimensions than the enclosed hollow rectangular cuboid without departing from the scope of the present invention.

In one preferred embodiment the top and bottom halves may connect to one another side by side via magnetic connectors.

In another preferred embodiment the top and lower halves may connect to one another so as to be side by side via open ended channels which are located on the lower half into which bulbous protrusions on the top half can sliding engage and be retained therein.

The invention may also be said broadly to consist in the parts, elements and features referred to or indicated in the specification of the application, individually or collectively, in any or all combinations of two or more of said parts, elements or features.

Aspects of the present invention have been described by way of example only and it should be appreciated that modifications and additions may be made thereto without departing from the scope thereof as defined in the appended claims.

What is claimed is:

1. A protective case for a bicycle which has a top case part and a lower case part each case part having one or more wall sections substantially defining an interior area on the inner surface of said wall(s); wherein when said top and lower case parts are releasably connected to one another they form an at least substantially enclosed space; and wherein the lower case part of the protective case includes a stand attached thereto said stand adapted to connect to a bicycle frame of the bicycle, said stand extendable from a non-extended position without being detached from the lower case part, and
   with the top and lower case parts connected to one another and with the stand attached to the lower case part in the non-extended position, the case is configured for storage and transportation of the bicycle with wheels of the bicycle removed from the bicycle frame; and
   with the top case part removed from the top of the lower case part and with the stand attached to the lower case part in the extended position, the stand extends from the lower case part to support the fully assembled bicycle outside of the lower case part, the case is configured as a freestanding mobile workshop for working on the fully assembled bicycle.

2. A protective case for a bicycle as claimed in claim 1, wherein the top and lower case parts when connected together form a substantially enclosed hollow rectangular cuboid.

3. A protective case for a bicycle as claimed in claim 1, wherein the case includes LED lights around and/or proximate the top rim of the lower case part.

4. A protective case for a bicycle as claimed in claim 1, wherein the case includes a mount for affixing to a vehicle.

5. A protective case for a bicycle as claimed in claim 1, wherein the case includes indicator and tail light system for vehicles when the protective case is mounted to a tow bar or tow hitch.

6. A protective case for a bicycle as claimed in claim 1, wherein the case includes internal supports for holding gear bags.

7. A protective case for a bicycle as claimed in claim 1, wherein at least one outer side wall on the top case part of the protective case when connected side by side to the lower case part of the protective case is capable of folding down to a substantially planar horizontal position which can then act as a working floor and/or a further stabilizer.

8. A method of converting a protective case for a bicycle between a transport configuration and a work configuration, comprising the steps of:
  a) connecting a top case part and a lower case part of a protective case on top of one another and ensuring a telescopic stand attached to the lower case part holding said bicycle is in a retracted state: to effect the transport configuration for storage or transportation of the bicycle with wheels of the bicycle removed from a frame of the bicycle;
  b) disconnecting, the top case part and lower case part of the protective case;
  c) connecting the top case part and lower case part of the protective case to one another to be side by side and extending the telescopic stand to its fully extended state: to effect the work configuration and support the fully assembled bicycle outside of the lower case part.

* * * * *